United States Patent Office 2,854,343
Patented Sept. 30, 1958

2,854,343

FULL-FLAVORED DEHYDRATED FOOD PRODUCTS

Sumner I. Strashun, El Cerrito, and William F. Talburt, Berkeley, Calif., assignors to the United States of America as represented by the Secretary of Agriculture No Drawing. Application April 24, 1953
Serial No. 351,057

(Granted under Title 35, U. S. Code (1952), sec. 266)

1 Claim. (Cl. 99—206)

A non-exclusive, irrevocable, royalty-free license in the invention herein described, for all governmental purposes, throughout the world, with the power to grant sub-licenses for such purposes, is hereby granted to the Government of the United States of America.

This invention relates to the dehydration of fruit and vegetable juices, purees, pulps, extracts, infusions, nectars, blends of different juices, etc.; materials of this type being generically referred to herein as an edible liquid material of plant origin. The objects of the invention include the provision of techniques for enhancing the flavor of dehydrated products derived from fruit juices or other edible liquid materials of plant origin. Another object of the invention is the provision of dehydrated products which when reconstituted form edible liquids having the natural flavor of the original liquid from which they were prepared. A further object of the invention is the provision of products of the aforementioned type which retain their natural flavor even when stored for extended periods of time. Additional objects and advantages of the invention will be obvious from the description herein.

It is well known in the art that fruit juices and other edible liquids can be dehydrated to produce solid products which are essentially self-preserving in that they do not require refrigeration or canning. It is recognized however that such products even when prepared under the most favorable dehydrating conditions are deficient in natural flavor. The point is that most of the flavoring substances which give juices their characteristic flavors are volatile and during dehydration a large part of the volatile flavoring substances are evaporated with the water and hence not present in the final product. As a result when the dehydrated product is reconstituted, the resulting juice is lacking in natural bouquet. Although the juice is edible and nutritious, it does not possess the characteristic aroma and flavor of the freshly prepared juice.

It is obvious from the above that to produce a full-flavored dehydrated product, provision must be made to add to it volatile flavoring substances obtained either from the vapors evolved in the dehydration or from other sources. To realize this much however is not to have solved the problem. In the first place, virtually all of the volatile flavoring substances are liquids whereas the dehydrated products are solids and it is impossible to obtain a uniform mixture of the dehydrated solids with the small proportion of liquid flavoring substances required. The flavoring material is rapidly absorbed on whatever portion of the solid product it first contacts and will remain in position even after extended mixing so that a homogeneous product cannot be made. Another problem is that when the flavoring substance is merely mixed with dehydrated product, the final product does not retain its natural flavor. Whereas its flavor is originally satisfactory, on storage its strength decreases and further off-odors and unnatural tastes may develop due to oxidative or other deleterious reactions. In any event if the product is stored for a time it will be observed that the reconstituted juice prepared therefrom does not taste like the natural juice.

It has now been found that the problems outlined above are obviated if the flavoring substance is incorporated with sorbitol and the resulting solid product containing sorbitol and flavoring substance is admixed with the dehydrated product. The composition containing sorbitol and flavoring substance is a solid, hence may be made into granular form and mixed with the dehydrated product to form a final product wherein the flavor particles are homogeneously distributed throughout. Another point is that when incorporated in sorbitol, the flavoring substance is stable so that the final product retains its natural flavor even for extended periods of time. Thus the soribtol acts in some way to prevent vaporization of the flavoring substance and protects it from oxidative or other deleterious reactions.

In applying the principles of this invention, an edible liquid of plant origin is first prepared as by pressing, comminuting, macerating, crushing, or extracting with water the edible portions of fruit or vegetables as for example orange, grapefruit, lemon, lime, apple, pear, apricot, strawberry, raspberry, pineapple, grape, prune, peach, cherry, banana, tomato, celery, carrot, spinach, water cress, and so forth. The liquid preparation may be clear, contain suspended pulp, or may even be thick like a puree. The liquid preparation is then subjected to dehydration to produce a dried product. This operation can be carried out in any of several ways utilizing diverse processes and apparatus. Thus, for example, one may utilize spray drying, drying under vacuum from the frozen state, drum drying at atmospheric pressure or preferably under vacuum, continuous belt drying at atmospheric pressure or preferably under vacuum. The liquid may be subjected to concentration prior to application of the dehydration operation. A preferred method of drying involves concentration of the liquid followed by dehydration of the concentrate through the application of heat and vacuum under controlled conditions. This technique, explained more fully hereinafter, is preferred because it gives rise to a dehydrated product which exhibits extremely rapid dehydration properties; other advantages of this technique are explained below.

The dehydrated product, however prepared, being deficient in flavoring constituents, is now ready for addition of the sorbitol-flavoring substance composition. To this end, a quantity of sorbitol is melted and into it is stirred the desired volatile flavoring component. To minimize vaporization of the flavoring substance, the sorbitol may be supercooled to about 70–80° C. (whereby it will remain liquid) prior to addition of the flavoring substance. In any event, the liquid mixture of sorbitol and flavoring substance is then allowed to cool and solidify. To promote crystallization, a minor amount of sorbitol crystals (metastable solid form), as seed, may be stirred into the liquid mixture. The solid product consists of matrix of sorbitol crystals with minute particles of the flavoring substance dispersed throughout the matrix and entrapped in the sorbitol crystals. The product may thus be regarded as a solid sol or emulsion wherein the continuous phase is sorbitol and the disperse phase is the flavoring substance. The solid composition is reduced to granular form as by grinding to put it into proper form for admixing with the dehydrated product. Preferably the ground product is subjected to vacuum prior to use to remove by vaporization the minor fraction of flavoring substance which is on the outer surface of the granules rather than entrapped within sorbitol crystals. This surface material is not protected from deterioration hence it is best to remove it. The proportion of flavoring substance to sorbitol is not critical and may be varied, for example from 1 to 20% of the composition. The proportion of sorbitol-flavoring composition to be added to the flavor-deficient dehydrated product will depend on the nature of the product in question, the degree to which the flavoring substance has been purified or concentrated and the strength of flavor desired. In many cases, excellent results are obtained by adding enough of the composition to furnish about .01 to 1% of the flavoring substance based on the weight of the flavor-deficient fruit or vegetable solids. In the case of citrus products, it is preferred that the sorbitol-citrus peel oil composition be added in an amount of about .05 to 0.1% based on the weight of citrus solids.

Although it is preferred to employ sorbitol in the preparation of the solid flavoring compositions, one may absorb the volatile flavoring substances on other solid materials such as sucrose, dextrose, gelatin, pectin, etc.

The flavoring substance which is used for incorporation with the sorbitol may be obtained in various ways. For example the vapors evolved during the concentration and/or dehydration of the original juice may be treated to recover the vaporized flavoring substances contained therein. Apparatus and processes for accomplishing such ends are well known to those skilled in the art. This technique is particularly adapted for use with such fruit juices as apple, pear, grape, strawberry, raspberry, cherry, pineapple, etc. If desired the original juice may be subjected to a special operation such as stripping at atmospheric pressure for the deliberate removal of volatile flavoring substances from the juice prior to carrying out the dehydration. Such a technique is preferable because the volatile essences are recovered from a relatively smaller volume of vapor than in the system where the primary aim is concentration or dehydration. The volatile essences recovered from the vapors evolved in stripping, concentration, or dehydration are preferably purified and concentrated so that they will emulsify properly with the molten sorbitol and yield flavor-stabilized compositions. A great deal of the water in the essences can be removed by distillation in efficient rectifying columns. Further purification to remove water and low-molecular weight alcohols can be accomplished by extracting the flavoring components from the distilled essence with isopentane or other hydrocarbon solvent in which water and low molecular weight alcohols are essentially insoluble. Also to achieve proper emulsification of the purified flavoring substances with the molten sorbitol, an edible oil such as rice oil may be incorporated with the flavoring substance prior to admixture with the molten sorbitol. This technique of recovery of the volatile essences from vapors evolved in concentration or dehydration, followed by purification and concentration of the essence is particularly adapted for use with non-citrus products such as apple, pear, grape, peach, pineapple, cherry, raspberry, strawberry, prune, plum, and the like. In the case of citrus products, it is preferred to use peel oil of the citrus fruit in question as the flavoring substance rather than recovering the flavoring components from the vapors evolved in evaporation treatments. Thus for the flavor-enhancement of dehydrated orange juice, the preferred flavoring ingredient is cold-pressed orange peel oil which is actually the substance which gives fresh orange juice its characteristic flavor. Similarly, grapefruit peel oil would be used for dehydrated grapefruit juice, lemon peel oil for dehydrated lemon juice, and so forth. The citrus peel oils are naturally in a concentrated state and can be directly emulsified with the molten sorbitol.

The preferred method of dehydrating the juice or other edible liquid, mentioned briefly above, involves concentrating the juice then dehydrating the liquid concentrate by maintaining it in contact with a heated surface while being exposed to vacuum, the conditions of temperature being controlled to get rapid dehydration without damage to the product. A primary advantage of the aforesaid process is that the drying under vacuum in contact with a hot surface results in a puffing or expansion of the material during dehydration, this expansion being caused by the entrapment of a multitude of small steam bubbles throughout the mass. This expansion is very desirable as the final product is then in a porous form due to the presence of the numerous small voids. The product thus is easy to remove from the trays, breaks up easily into free-flowing small particles or flakes and exhibits an extremely high rate of rehydration so that a reconstituted juice can be prepared by agitating with water for less than one minute. The expansion of the product also has the advantage that it accelerates the rate of dehydration. Thus when the material expands, moisture can diffuse out of the mass very readily so that dehydration is completed in a short time—an hour or less in many cases. Such favorable action cannot be obtained if the material would remain constant in volume or shrink during dehydration; in such case moisture diffuses slowly through the dense mass and dehydration requires a long period of time—as much as ten times longer than where extensive expansion is obtained. A further advantage of expansion during dehydration is that in the expanded condition there is a pronounced evaporative cooling effect so that the temperature applied for dehydration can be high to get rapid dehydration without overheating the product. Where there is no expansion, the evaporative cooling effect is minor and dehydration temperatures must be kept low to prevent overheating; as a result the dehydration time is greatly extended.

To effectuate the above-outlined technique of dehydration, the fruit juice or other edible liquid is subjected to concentration so that it will be in proper condition for the subsequent dehydration step. A single-strength juice cannot be subjected directly to dehydration because it will boil and spatter violently and may not expand properly. On the other hand when the concentrate is applied in the dehydration it expands by entrapping the steam bubbles and little boiling or spattering is obtained. In general the liquid is concentrated as much as possible to still obtain a flowable liquid. Thus the subsequent dehydration step necessitates starting with a liquid concentrate but to decrease expense and time of dehydration as much moisture as possible should be removed during the concentration step to the point of obtaining a concentrate which is still capable of flowing. In many cases a satisfactory concentrate will have a density about from 35 to 80° Brix. As conventional in the concentration of fruit juices, it is preferred to conduct the concentration under vacuum at a temperature not over about 50–150° F., the particular temperature being dependent on the heat-sensitivity of the liquid in question, thus to avoid heat damage to the material.

The concentrate as above prepared is then ready for dehydration to the solid state. This dehydration is preferably achieved by the application of vacuum to the concentrate while it is spread on a heated surface. To this end, the concentrate is poured on trays which are placed in a vacuum drier equipped with hollow shelves through which heating or cooling media can be circulated. The depth of liquid in the trays will depend on the available space between shelves, taking into account the fact that as dehydration proceeds the material will expand in volume up to 20 times. In general, to fully utilize the available space, the liquid level should preferably be such that after expansion it almost contacts the bottom of the shelf immediately above the tray. For example, in a drier having a 2½″ space between shelves the concentrate is loaded to a depth of about ⅛″ whereby on a 16-fold expansion it will exhibit a final depth of 2″ on dehydration.

After inserting the trays containing concentrate into the drier, the drier is closed and vacuum applied, the vacuum being maintained until dehydration is completed. It is a feature of this invention that pressures of around 2 to 20 mm. of Hg are used. Vacuums in this range are easy to obtain with relatively inexpensive equipment such as steam ejectors and require the pumping of relatively small volumes of water vapor as compared with systems using vacuums on the order of several microns where very expensive, efficient vacuum pumps, Dry Ice traps, etc. are essential. A heating medium is circulated through the hollow shelves so that the concentrate is heated by conduction through the tops of the shelves, the bottoms of the trays, and so to the product. Heating also takes place by radiation from the bottoms of the shelves to the surface of the concentrate on the shelves below. Usually it is desirable to start the circulation of hot medium prior to insertion of the trays so as to achieve more rapid heating. In such case the tray insertion and closing of the drier should be as rapid as possible to avoid heat damage to the concentrate. In any event the shelves are maintained at a temperature near or above the boiling point of water, i. e., about 150–300° F. Of course the product will not assume this high temperature because it is being cooled by the evaporative process. However the temperature of the product should be checked from time to time. When the product temperature rises to about 110–175° F. (due to falling off of the rate of evaporation), the temperature of the circulating medium should be immediately decreased, as by circulating cold water, to abruptly decrease the shelf temperature, then a medium at about 110–175° F. is circulated through the shelves. The desideratum during this phase of the dehydration is to maintain the product temperature at about 110–175° F. until it is dry. The principle of the dehydration thus involves two distinct stages. In the first stage a high temperature is applied to the product but the rapid rate of evaporation keeps the product temperature down. As the rate of evaporation falls off and the product temperature rises the second stage is started. At this point the temperature applied to the shelves is reduced so that the product temperature remains at about 110–175° F. until drying is completed. In many cases the upper limit of product temperature should be below 175° F. to avoid heat damage to the product. Thus for citrus products, a desirable temperature range for the second stage is about 110–125° F.; in the case of tomato and other less heat-sensitive products, a desirable temperature range for the second stage is about 110–150° F. The two-stage dehydration which is employed is advantageous because rapid evaporation of moisture is obtained yet heat damage to the product is minimized. Thus by applying a high temperature to the hollow shelves during the first stage, a very rapid evaporation of moisture is obtained whereas the cooling effect of the evaporation keeps the temperature of the product below temperatures at which damage would occur. In the second stage, the shelf temperature is lowered because the rate of evaporation has decreased. However even during this second stage, the product is maintained at a temperature at which evaporation takes place readily and the product temperature is below that at which damage would occurr. It is to be noted that in changing over from the first stage to the second stage, the shelves cannot be instantaneously dropped to the desired temperature because of the large mass of metal which must be cooled. For this reason the product temperature may temporarily rise above 175° F. (or other upper limit used with the particular material). Exposure of the product to such an excessively high temperature for short periods of time will cause a negligible amount of heat damage.

When the drying cycle is completed as indicated by the product reaching the same temperature as the shelves thus signifying absence of evaporation, the temperature of the shelves is reduced by circulating cold water through the hollow shelves. The reason for this is to reduce the product temperature to 100° F. or below whereby the product loses its plastic character and becomes brittle and easily friable. The point is that while the mass is above 100° F. it is plastic and would be difficult to remove from the trays and even if removed would not break up properly. By cooling the mass it becomes easy to remove from the trays and easy to break up. Thus after the product is cooled to about 70 to 100° F., the vacuum is broken, the drier opened and the trays removed. By applying a spatula to the trays the product is easily removed, the scraping action of the spatula breaking up the product into a mass of fine flakes. For optimum results it is preferred that the vacuum drier be located in a room in which the atmosphere is regulated at a very low humidity. This will reduce any danger of moisture regain by the product.

The above-described dehydration process utilizes a vacuum tray drier; however, other types of dehydration equipment such as continuous belt dryers or continuous tubular dryers or drum dryers operated under similar conditions of temperature and vacuum can be used.

In order to obtain satisfactory expansion during dehydration according to the above-described technique it is necessary in some cases to first remove part of the pulp from the liquid to be dehydrated. For example, tomato juice contains about 20–30% by volume of pulp and in this condition will not expand properly in dehydration. Thus with this juice, the pulp content is first reduced to less than about 6% by screening or centrifuging, then the partly de-pulped juice is subjected to the concentration and expansive dehydration as described. The removed pulp may be separately dried in a vacuum tray drier or other conventional drier and admixed with the dried partly depulped juice. In the case of orange juice, successful expansion during dehydration can be achieved with ordinary juice which contains about 12% pulp by volume. If however it is desired to dehydrate an orange puree or other liquid orange preparation containing more pulp than does juice, then part of the pulp must first be removed so that the liquid being treated does not contain more than about 12% pulp by volume. Whether any particular edible liquid will expand properly on dehydration can easily be determined by concentrating it then placing the concentrate on the surface of a heater which is surrounded by a bell jar. The interior of the jar is evacuated while the heater surface is brought up to 200–212° F. The concentrate is observed to see if it expands. If the material expands at least three times, preferably 10–16 times, in volume, the pulp content is not too high and the material may be successfully processed. If the degree of expansion is less than specified above a decrease in pulp content will be required to make the juice amenable to dehydration.

In the event that pulp is removed from the liquid prior to dehydration, it is preferable to then separately dehydrate the pulp and add it back to the dehydrated liquid so that the final product will form on reconstitution a liquid of the desired pulp content. It is to be noted that dehydration of the separated pulp presents no problem as it may easily be dried in many different types of apparatus. For example, it is preferred to dry it in a vacuum tray drier using the same two-stage temperature heating as explained hereinabove. Because of its high fiber content, the pulp does not shrink during dehydration but maintains its original volume and forms a porous mass which is easy to remove from the trays and which is easy to break up into small fragments. Further, it slurries very rapidly when agitated with water and thus its addition to the dehydrated liquid fraction does not decrease the rate of reconstitution. Since the pulp has properties which make it easy to dry, it can be dried in various devices such as dryers of the drum, cabinet, or rotary kiln type.

Although drying aids such as methyl cellulose, dextrin, corn syrup, corn syrup solids, etc. can be added to the edible liquid prior to dehydration, it is a feature of the two-stage temperature dehydration under vacuum described above that no drying aid need be added, particularly if the edible liquid is first concentrated to at least about 50° Brix. Thus this particular technique of dehydration has the advantage that no foreign material need be added and the final product consists entirely of dehydrated fruit or vegetable solids. If it is desired to conduct the dehydration on a concentrate of fruit solids content below about 50° Brix, then it is preferred to add sufficient dextrinous material such as dextrin, corn syrup, or corn syrup solids so that when the two-stage temperature dehydration under vacuum is carried out, the concentrate will expand thus to yield a porous product. The dextrinous material in addition to enhancing the degree of expansion during dehydration also reduces the hygroscopicity of the final product. The amount of dextrinous material required will vary depending on the nature of the particular juice in question and the degree of concentrate which has been applied. In general the proportion of dextrinous material may be in the range from about 5 to 70% based on the fruit or vegetable solids in the concentrate. The proper amount of dextrinous matrial to add in any case can easily be determined by adding various proportions or corn syrup solids or other dextrinous materials to samples of the concentrate then subjecting the samples to vacuum and heating in a thin layer to observe which proportion causes a desirable expansion of at least 3 times, preferably 10–16 times, in volume.

It is often desirable to add sulphur dioxide or other sulphiting agent to the liquid being treated to stabilize the final product and prevent browning during the processing and storage of the finished article, particularly if stored at elevated temperatures. To this end sulphur dioxide, sodium sulphite or bisulphite is added in such amount that the dehydrated product will contain about from 50 to 250 p. p. m. of $SO_2$. A convenient point to add the sulphite or bisulphite is to the liquid concentrate prior to dehydration. If necessary, ascorbic acid or fat-stabilizing antioxidants such as those listed below may be added to the final product or to the liquid at any stage in the processing to prevent oxidation of flavoring and/or other oxidizable components. A convenient plan for adding the antioxidant to protect the flavoring component is to mix the antioxidant with the flavoring substance and then incorporate this mixture with the molten sorbitol. Addition of the antioxidant to the sorbitol-flavoring component composition will further minimize the possibility of loss in flavor of the final product, that is, the mixture of dehydrated fruit or vegetable solids and the flavoring agent-sorbitol composition. In general, the amount of antioxidant applied may be from about 0.001% to about 0.1% of the weight of the fruit or vegetable solids. Some of the antioxidants which may be used are listed below merely by way of example:

Tocopherols, i. e., alpha-, beta-, and gamma-tocopherol.

Gum guaiac.

Nordihydroguaiaretic acid.

Gallic acid and its esters as for example, the propyl, butyl, amyl, hexyl, octyl, dodecyl, tetradecyl, hexadecyl, and octadecyl esters.

Ascorbic acid and isoascorbic acid and their esters, as for example, ascorbyl or isoascorbyl palmitate, stearate, and so forth.

Thiodipropionic acid and its esters, as for example, the dioctyl and the didodecyl esters.

Phenolic derivatives, as for example, butylated hydroxyanisole; catechol monobenzoate; 2-tert-butyl, 4-methoxy phenol; p-tert-butyl catechol; 2,4-dimethyl-6-tert-butyl phenol, dibenzyl cathechol; octyl cresol; 2,7-dihydroxy naphthalene; 2,5-dihydroxy diphenyl; and so forth.

Hydroquinone derivatives, as for example, 2,5-ditert-butyl hydroquinone; 2,5-dibenzyl hydroquinone; 2,5-ditert-amyl hydroquinone; 2,5-bis(dimethylaminomethyl) hydroquinone; 2,5-bis(dimethylaminomethyl) quinone; 2,5-bis(dimethylaminomethyl)-3,6-di-tert butyl hydroquinone; 2,5-bis(dimethylaminomethyl)-3,6-di-tert butyl quinone; 2,5-bis(dimethylaminomethyl)-3,6-di-tert amyl hydroquinone; 2,5-bis(dimethylaminomethyl)-3,6-di-tert amyl quinone; and so forth.

Quinoline derivatives, as for example, 6-ethoxy-2,2,4-trimethyl-1,2-dihydroquinoline; 6-phenyl-2,2,4-trimethyl-1,2-dihydroquinoline; 2,2,4-trimethyl-1,2-dihydroquinoline; etc.

Hydrocaffeic acid and its esters, for example, ethyl hydrocaffeate.

Pyrogallol derivatives, as for example, 4-acetyl pyrogallol; 4-propionyl pyrogallol; 4-butyryl pyrogallol; 4-valeryl pyrogallol; 4-isovaleryl pyrogallol; 4-diethylacety) pyrogallol; 4-acetyl-6-ethyl pyrogallol; 4-acetyl-6-tert. butyl pyrogallol; and so forth.

The dry product which preferably contains not more than about 4% moisture, is packaged in tin cans or other containers which can be sealed to an air tight condition. It is obvious that since our product is virtually completely dehydrated it is not perishable and may be kept indefinitely at room temperature or higher. For constitution the calculated amount of water is dumped onto the dehydrated product and after agitation for a few seconds is ready to serve.

In packaging the dehydrated products it is often advantageous to insert the sealed package a porous container holding a desiccant. The desiccant has the effect of removing the last traces of moisture from the dehydrated product whereby to increase its stability and shelf-life. It is known that for maximum stability the dehydrated products should have a moisture content of less than 1%. However, to obtain such a low moisture level by dehydration would require an excessive period of time and increase the possibility of heat damage. For this reason by the use of a desiccant the powder may be packaged at say 3% moisture content and the desiccant will gradually lower the moisture content of the product to minimum levels during storage. Although it is preferred to use calcium oxide as the desiccant, one may also use calcium chloride, magnesium perchlorate, calcium sulphate, etc.

The invention is further illustrated by the following example:

A lot of oranges were reamed to prepare fresh orange juice. This juice was then concentrated to 60° Brix by high-vacuum, low-temperature evaporation.

The concentrate was then subjected to dehydration in a vacuum drier equipped with shelves to hold trays of the material to be dried, the shelves being hollow so that heating or cooling media could be circulated therethrough. Thus the concentrate was loaded into trays— about ½ lb. per sq. ft. which gave a liquid depth of about ⅛". The loaded trays were placed on the shelves in the vacuum drier, the drier being then closed and the vacuum started to maintain a pressure of 2 mm. Hg within the apparatus. The initial shelf temperature was 200° F. this temperature being maintained until the product temperature reached 120° F. (25 minutes). The temperature of the shelves was then dropped to 125° F. and maintained at this level until the 50th minute when the dehydration was complete. After this period, cool water was circulated through the drier shelves and the vacuum broken and the dehydrated orange juice removed after a total of 60 min. of operation.

It was observed that the concentrate expanded about 16 times in volume during dehydration, retaining this expanded volume in the final product thus to yield a dry product which was porous, easy to remove from the shelves and which broke up readily into free-flowing flakes which formed a reconstituted juice by stirring in water for a few seconds. On tasting the juice it was noted to be lacking in aroma and characteristic flavor.

A quantity of sorbitol was melted and to it was added with stirring 10% of its weight of cold-pressed orange peel oil. The mixture was allowed to cool and crystallize then subjected to grinding to break it up into granules. The granules were subjected to vacuum to remove the minor fraction of flavoring components on the outside of sorbitol crystals.

The sorbitol-orange peel oil composition (5.0 grams) was then intimately mixed with 1000 grams of the dehydrated orange juice prepared as above described. The resulting final product was packed in sealed tin cans, each can containing 100 g. of the product together with a packet made of a porous paper containing 12 g. calcium oxide as a desiccant. Samples of the product were stored and tasted from time to time. It was found that even after storage for 6 months at 100° F. the products remained free flowing and on stirring with water for a few seconds formed a reconstituted juice, the flavor of the juice being excellent in that it was virtually undistinguishable from freshly prepared orange juice.

This application is a continuation-in-part of our copending application, Serial No. 334,384, filed Jan. 30, 1953.

Having thus defined the invention, what is claimed is:

A process for preparing a dehydrated product from an edible juice selected from the group consisting of fruit juices and vegetable juices which comprises concentrating such a juice to produce a liquid juice concentrate, raising the temperature of a relatively thin layer of the concentrate rapidly to a temperature of about from 110° to 150° F. and simultaneously reducing the pressure to about from 2 to 20 mm. of mercury to cause the concentrate to expand in volume, maintaining the product in an expanded state at such elevated temperature and reduced pressure for a period of not exceeding about one hour and until the dehydration is complete, thereafter reducing the temperature of the expanded, porous product to about from 70° to 100° F. while maintaining it under reduced pressure, breaking up the cooled, dehydrated product, adding thereto a solid composition containing a volatile flavoring substance, and packaging the final product in a sealed container.

References Cited in the file of this patent

UNITED STATES PATENTS

| | | |
|---|---|---|
| 2,067,205 | Robison et al. | Jan. 12, 1937 |
| 2,422,145 | Taylor | June 10, 1947 |
| 2,566,410 | Griffin | Sept. 4, 1951 |
| 2,629,665 | Gordon | Feb. 24, 1953 |
| 2,641,550 | Dykstra et al. | June 9, 1953 |
| 2,806,796 | Dorsey | Sept. 17, 1957 |

OTHER REFERENCES

"The Manufacturing Confectioner," October 1945, pp. 26 and 28.